Nov. 12, 1963   E. BOZOYAN   3,110,322
VALVE MECHANISM
Filed March 18, 1960   7 Sheets-Sheet 1

INVENTOR.
EDWARD BOZOYAN
BY
ATTORNEY

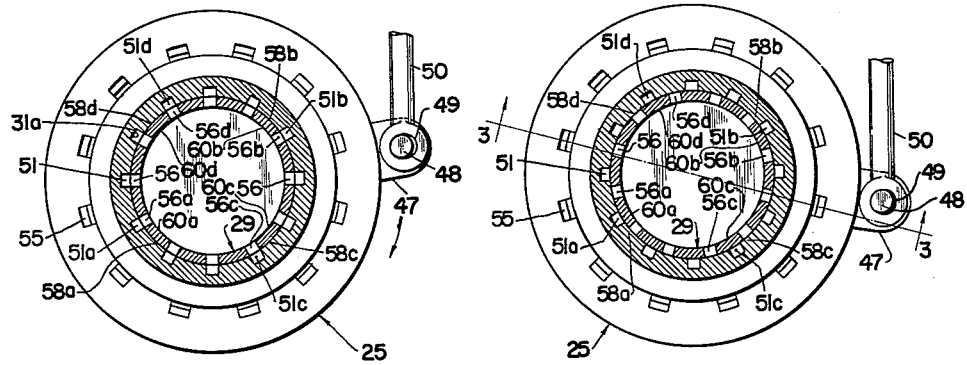
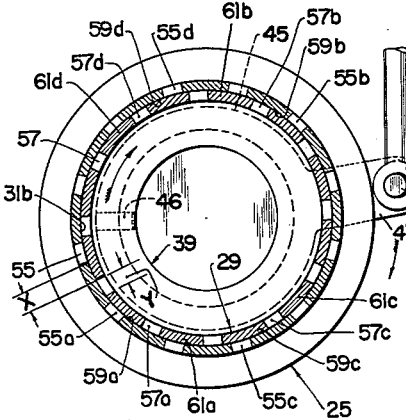
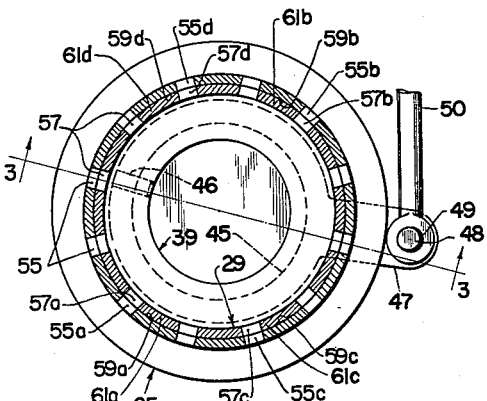
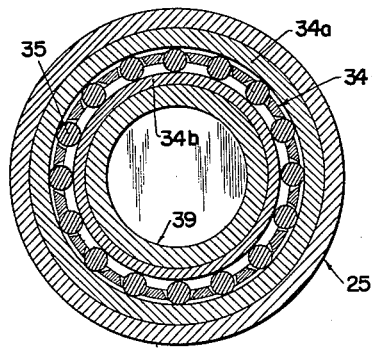
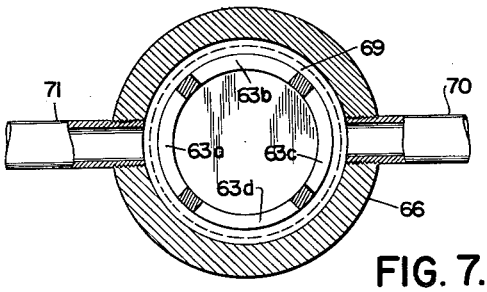

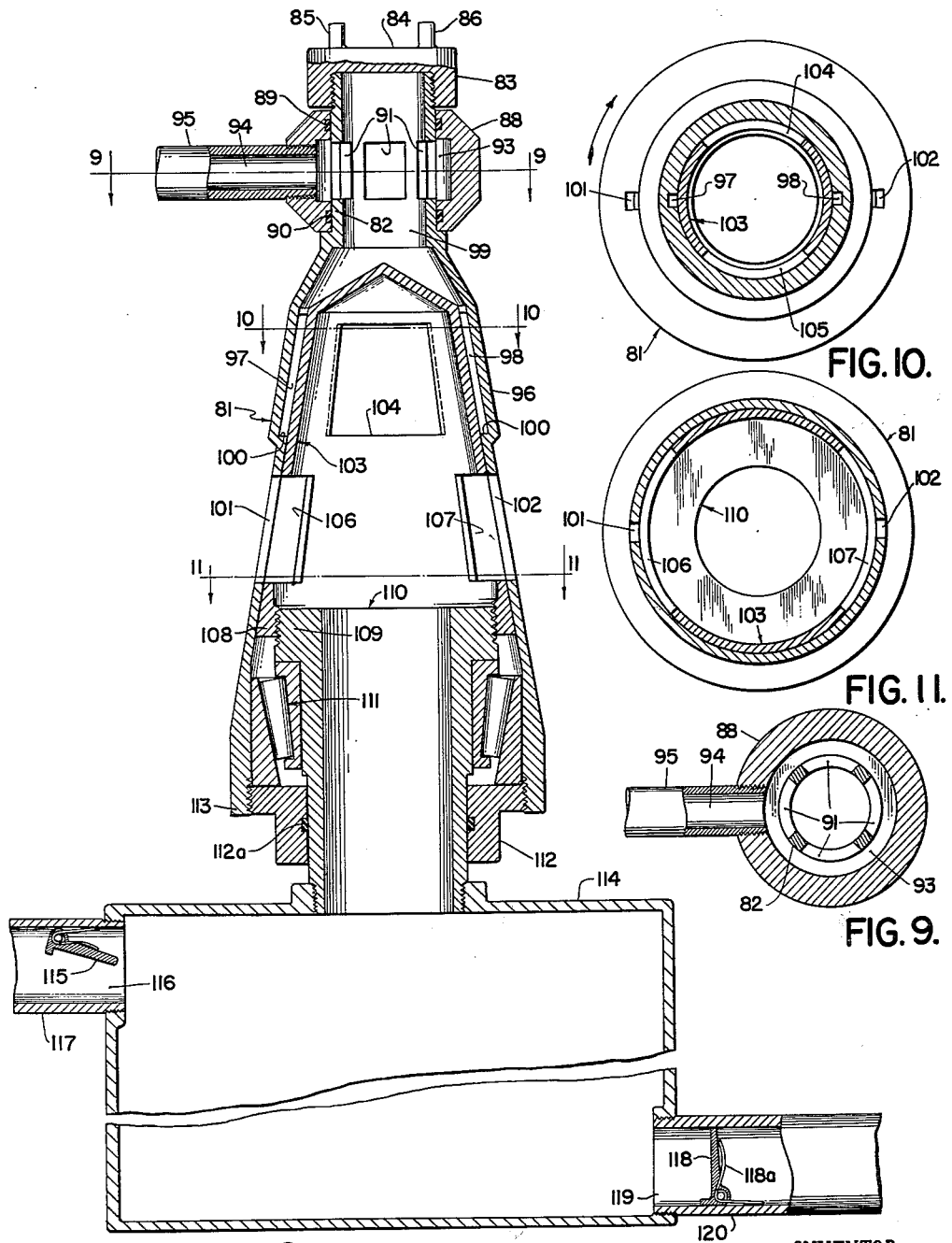

Nov. 12, 1963 E. BOZOYAN 3,110,322
VALVE MECHANISM
Filed March 18, 1960 7 Sheets-Sheet 4

INVENTOR.
EDWARD BOZOYAN
BY
ATTORNEY

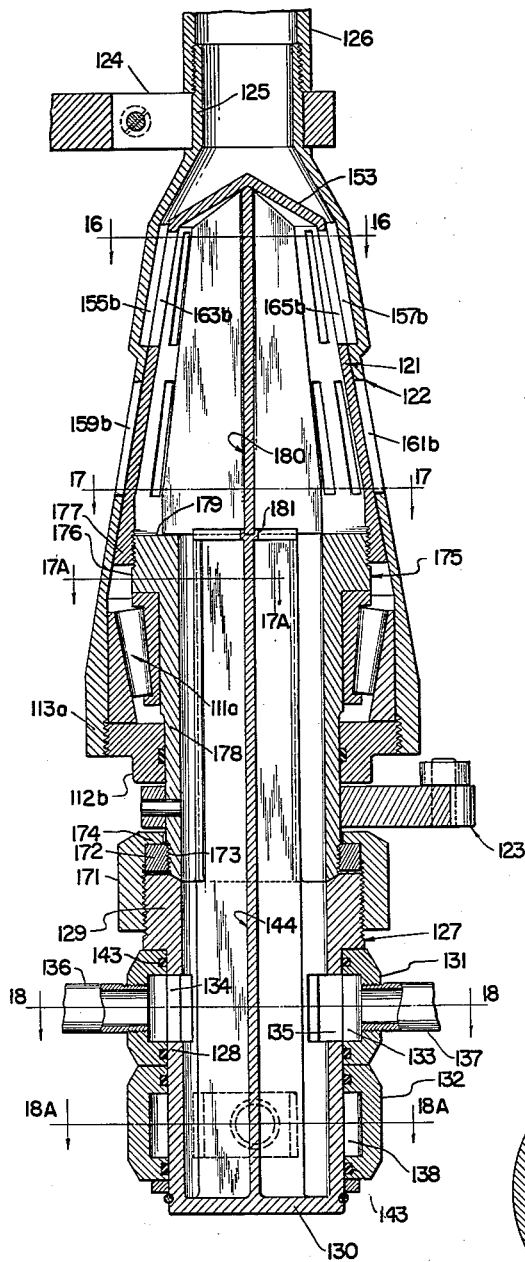
FIG. 15.
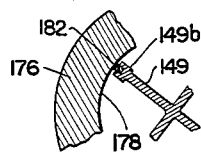
FIG. 17A.
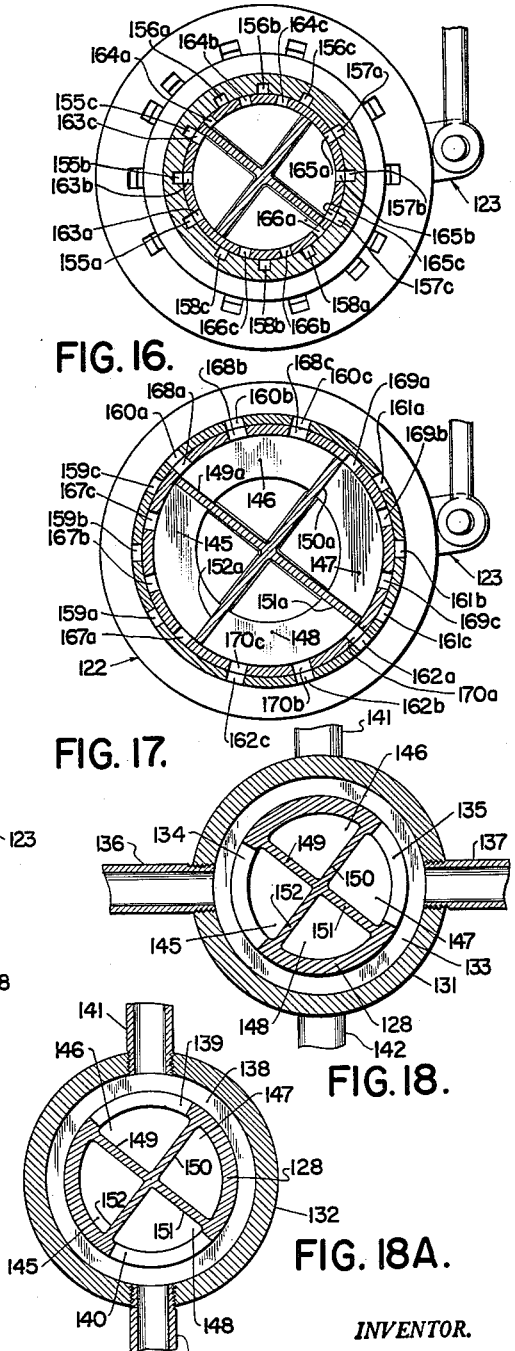
INVENTOR.
EDWARD BOZOYAN
BY
ATTORNEY Nov. 12, 1963  E. BOZOYAN  3,110,322
VALVE MECHANISM
Filed March 18, 1960  7 Sheets-Sheet 6

INVENTOR.
EDWARD BOZOYAN
BY
ATTORNEY

Nov. 12, 1963     E. BOZOYAN     3,110,322
VALVE MECHANISM
Filed March 18, 1960     7 Sheets-Sheet 7
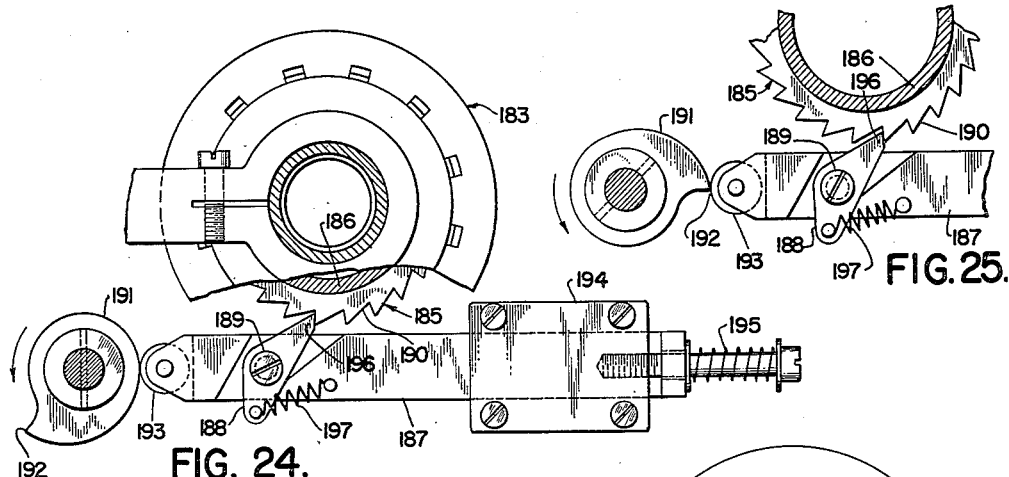
FIG. 25.
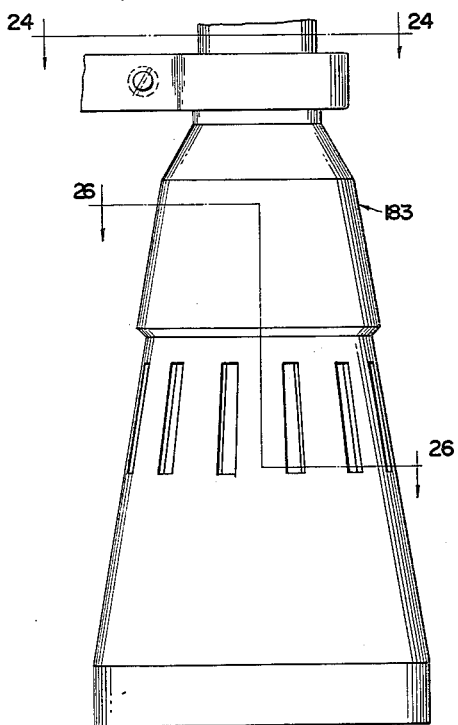
FIG. 24.
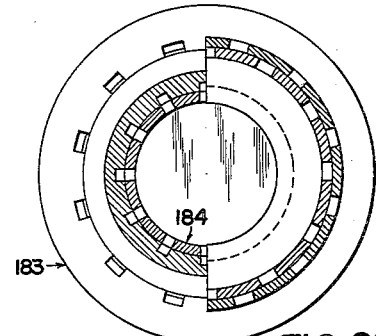
FIG. 26.
FIG. 26A.
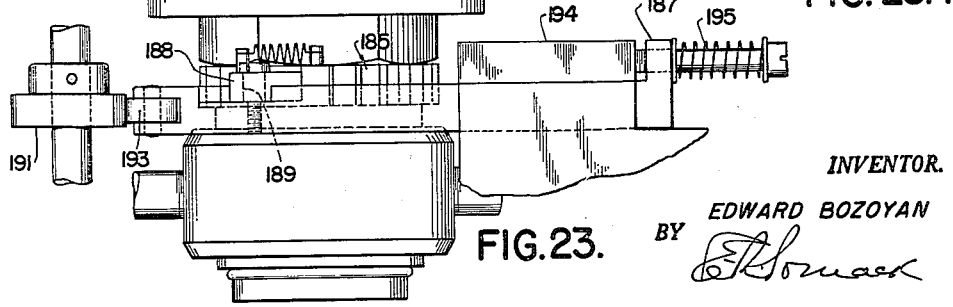
FIG. 23.
INVENTOR.
EDWARD BOZOYAN
BY 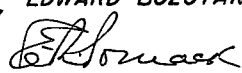
ATTORNEY

United States Patent Office 3,110,322
Patented Nov. 12, 1963

3,110,322
VALVE MECHANISM
Edward Bozoyan, 1812 West St., Union City, N.J.
Filed Mar. 18, 1960, Ser. No. 15,940
30 Claims. (Cl. 137—625.23)

This invention relates to valve mechanisms for supplying fluid power, through a pressure fluid, to pressure-actuated apparatus, this application being a continuation-in-part of my application filed June 19, 1958, Serial No. 743,083, which matured into Patent No. 2,929,336 on March 22, 1960.

A common shortcoming of valve devices for regulating or controlling the flow of fluids for power purposes is the danger of unbalanced action. Particularly where the operation requires sudden surges of power, the impact of the fluid medium tends to throw the moving valve element off balance, and in certain constructions causes breakage, binding and excessive wear. It is accordingly an important object of my invention to eliminate this shortcoming in valve mechanisms of the aforesaid category by providing a fully balanced structure. In this aspect of my invention I accomplish this objective by providing a sleeve valve mechanism with sets of diametrically opposed inlet and exhaust ports, the arrangement being such that the entering and discharging fluids exert simultaneously equal and opposite pressures on the cooperating sleeve members. I have found that my invention not only produces dynamic balance and even operation, but also results in little wear and friction, and consequently in light operation and reduced power consumption, as compared with other power supply valves. These results are due to the fact that the inlet and exhaust fluid movements in my invention occur at spaced circumferential portions of the coacting sleeves, whereby equally distributed and circumferentially balanced forces are at all times operatively brought into play.

It is another object of my invention to provide power valve mechanisms that can be operated either by reciprocating and oscillatory action, or by continuous rotary action.

Still other objectives of this invention are the provision of means to effectuate relatively high frequency valve cycles where that may be required, to make high volume power fluid deliveries by relatively slight actuating strokes of the movable sleeve member, and to effect the distribution of fluid power, in different cycles, to several outlets for use by a number of separate apparatus. In connection with certain aspects of my invention, I have found that complete operative cycles can be obtained with minute actuating movements. And I have also found that, because of the aforesaid balanced construction and minute movement features, there is substantially no drag between the two coacting sleeve members to create undue friction, whereby the movable sleeve is sensitive to actuation by a relatively slight force.

A further object of this invention is to provide a self-contained valve mechanism that can be removably connected to a fluid-actuated apparatus, as well as controlled and adjusted from a readily accessible position, thereby facilitating manufacture and maintenance.

And it is within the contemplation of my invention to provide a relatively simple and inexpensive device having the features above mentioned.

Other objects, features and advantages will appear from the drawings and the description hereinafter given.

Referring to the drawings,

FIG. 4 is a section of FIG. 1 taken along line 4—4.

FIG. 5 is a section of FIG. 1 taken along line 5—5, showing the device in its charging position.

FIG. 5A is a view like FIG. 5, but showing the device in its discharging position.

FIG. 6 is a section of FIG. 1 taken along line 6—6, showing the device in its charging position.

FIG. 6A is a view like FIG. 6, but showing the device in its discharging position.

FIG. 7 is a section of FIG. 1 taken along line 7—7.

FIG. 8 is a vertical section of another form of my invention showing it operatively connected to a pumping apparatus, the device being shown in its discharging position.

FIG. 9 is a section of FIG. 8 taken along line 9—9.

FIG. 10 is a section of FIG. 9 taken along line 10—10.

FIG. 11 is a section of FIG. 8 taken along line 11—11.

FIG. 15 is a longitudinal section of another embodiment of my invention.

FIG. 16 is a section of FIG. 15 taken along line 16—16.

FIG. 17 is a section of FIG. 15 taken along line 17—17.

FIG. 17A is a fragmentary section of FIG. 15 taken along line 17A—17A.

FIG. 18 is a section of FIG. 15 taken along line 18—18.

FIG. 18A is a section of FIG. 15 taken along line 18A—18A.

FIG. 23 is a front elevational view of another modification of my invention with a ratchet mechanism for intermittent rotary motion.

FIG. 24 is a section of FIG. 23 taken along line 24—24, the pawl slide being shown in a retracted position.

FIG. 25 is a fragmentary view of FIG. 24 with the pawl slide being shown in its projected operative position.

FIG. 26 is a section of FIG. 23 taken along line 26—26 with the device in the charging position.

FIG. 26A is a section of FIG. 23 taken along line 26—26 with the device in the discharging position.

Figure 1:
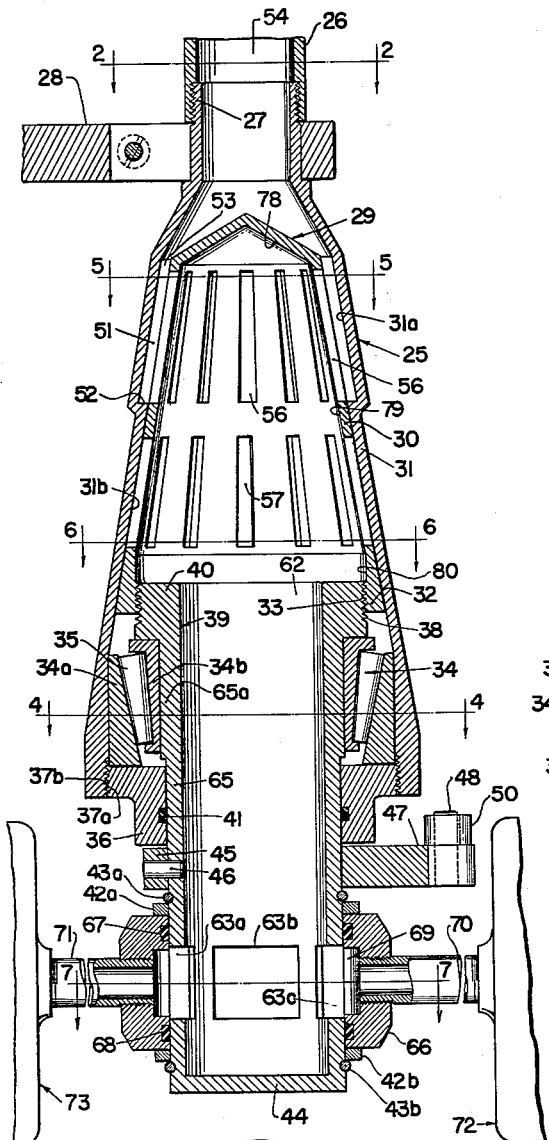
FIG. 1 is a longitudinal section of an embodiment of my invention, shown in its charging position, fragments of two pressure-actuated devices being shown operatively connected to the apparatus of this invention.

In the form of my invention illustrated in FIGS. 1 to 7, the valve mechanism has a stationary outer sleeve member 25 of generally frusto-conical configuration flared downwardly and outwardly, the fluid supply conduit 26 being connected to the upper neck 27 fixedly secured to the stationary clamp 28, said outer sleeve member being disposed over and about an inner sleeve member 29 which has a generally conical lateral wall 30 proportioned for rotatable engagement with the lateral wall 31 of said outer sleeve member. The inner sleeve member 29 has at the bottom thereof the thickened peripheral portion 32 containing the inner threaded portion 33 in engagement with the threaded portion 38 of the upper flange 40 of the downwardly extending conduit member 39. In circumferential engagement with the lateral wall 65 of said conduit member is the adjustable flanged bushing 36 the annular threaded portion 37a of which is in engagement with the inner annular threaded portion 37b at the bottom of the outer sleeve member 25. Mounted upon said bushing 36 is the conventional roller bearing assembly generally designated 34 operatively disposed between the inner surface of the outer sleeve 25 and the outer surface of the wall portion 65a of the conduit member 39. The details of said roller bearing assembly are not set forth, as its construction is well known to those skilled in the art. Suffice it to say, for the purposes of this specification, that the ring components 34a and 34b are in rollable engagement with the rollers 35, so that an operative rotation of the conduit member 39 and inner sleeve member 29 with respect to the stationary sleeve member 25 will be facilitated, as will more clearly appear from the description hereinafter given. The said bushing 36 can be rotatably manipulated for adjusting up or down movements, so as to establish and maintain the optimum positional relationship between the two sleeves and between said bearing member and said sleeves. In the form illustrated, the portion above the bushing is grease packed, the bushing having the peripheral packing ring 41 in engagement with the wall 65 of the conduit member to effect a proper seal.

The said wall 65 of said conduit member 39 has the diametrically opposite outlet passageways 63a, 63b, 63c and 63d in communication with the interior of the conduit ring member 66, to be later described, said ring member being held against vertical displacement by the two stop rings 42a and 42b enveloping said wall 65 and flanking said ring member 66, the snap rings 43a and 43b holding said stop rings 42a and 42b against upward and downward displacement, respectively. The bottom of said conduit member 39 is provided with the closure base 44.

The conduit member 39 is operatively rotated by means of a collar 45 fixedly secured about the wall 65 by a pin 46, said collar having a laterally extending arm 47 with an upstanding pin 48 extending through the aperture 49 of the reciprocating link 50 actuated, in known manner, by means not shown.

The said outer sleeve member 25 has at the upper inner portion thereof a plurality of circumferentially disposed longitudinally elongated equally spaced channels 51 constituting inlet passageways, as will more clearly hereinafter appear. Each of these channels is closed at the bottom by a floor 52 and open at the top at 53 (FIG. 1) so as to permit communication between said channels and the fluid inlet passageway 54. At a lower portion of the outer sleeve member 25 are a plurality of circumferentially disposed longitudinally elongated equally spaced exhaust ports 55. The said inner sleeve member 29 has at the upper portion thereof a plurality of circumferentially disposed elongated equally spaced upper inlet ports 56 corresponding in number and spacing to said inlet channels 51, and at the lower portion thereof a plurality of lower circumferentially disposed lower exhaust ports 57 corresponding in number and spacing to said exhaust ports 55.

It is of importance to note that the respective sets of channels and ports are even in number, opposite openings being in diametral relation. Specifically, each of the channels 51 has a diametrically opposite counterpart, such as 51a and 51b, 51c and 51d, etc.; and each of the wall portions therebetween has a diametrically opposite counterpart, such as wall portions 58a and 58b, 58c and 58d, etc. Similarly, each exhaust port 55 of the outer sleeve has a diametrically opposite counterpart, such as 55a and 55b, 55c and 55d; and each of the wall portions therebetween has a diametrically opposite wall portion, such as wall portions 59a and 59b, 59c and 59d, etc. In the inner sleeve member, there are likewise diametrically opposite pairs of inlet ports, such as 56a and 56b, 56c and 56d; pairs of diametrically opposite wall portions between said ports, such as wall portions 60a and 60b, 60c and 60d; diametrically opposite pairs of exhaust ports, such as 57a and 57b, 57c and 57d; and diametrically opposite pairs of wall portions between said latter ports, such as wall portions 61a and 61b, 61c and 61d. These diametrically opposite pairs of elements coact, in a manner to be hereinbelow set forth, so as to create the balanced condition in accordance with the objectives of my invention.

The aforesaid conduit member 39, containing the central conduit 62, communicates with the interior of the inner sleeve member 29, and with said outlet ports 63a, 63b, 63c and 63d in the said lateral annular wall 65 of the conduit member. Rotatably disposed around and in engagement with said latter wall is said conduit ring member 66 having packing rings 67 and 68 in operative engagement with the outer surface of said wall 65, the said member 66 being held against disengagement by the said stop rings 42a and 42b. Said ring contains an annular chamber 69 communicating with said ports 63a, 63b, 63c and 63d, and with the diametrically opposite pipes 70 and 71 extending into the respective pressure-actuated devices generally designated 72 and 73 (FIG. 1).

Figure 3:
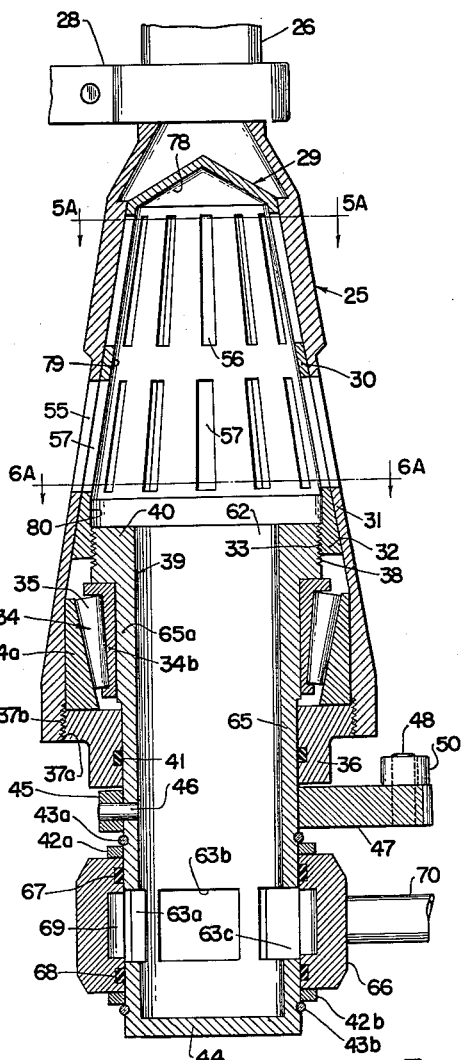
FIG. 3 is a fragmentary longitudinal section, partly in elevation, of the device of FIG. 1 shown in its operative discharging position.
Figure 2:
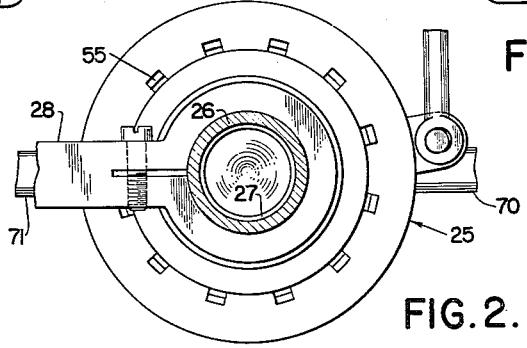
FIG. 2 is a section of FIG. 1 taken along line 2—2.
Figures 12, 13, 14:
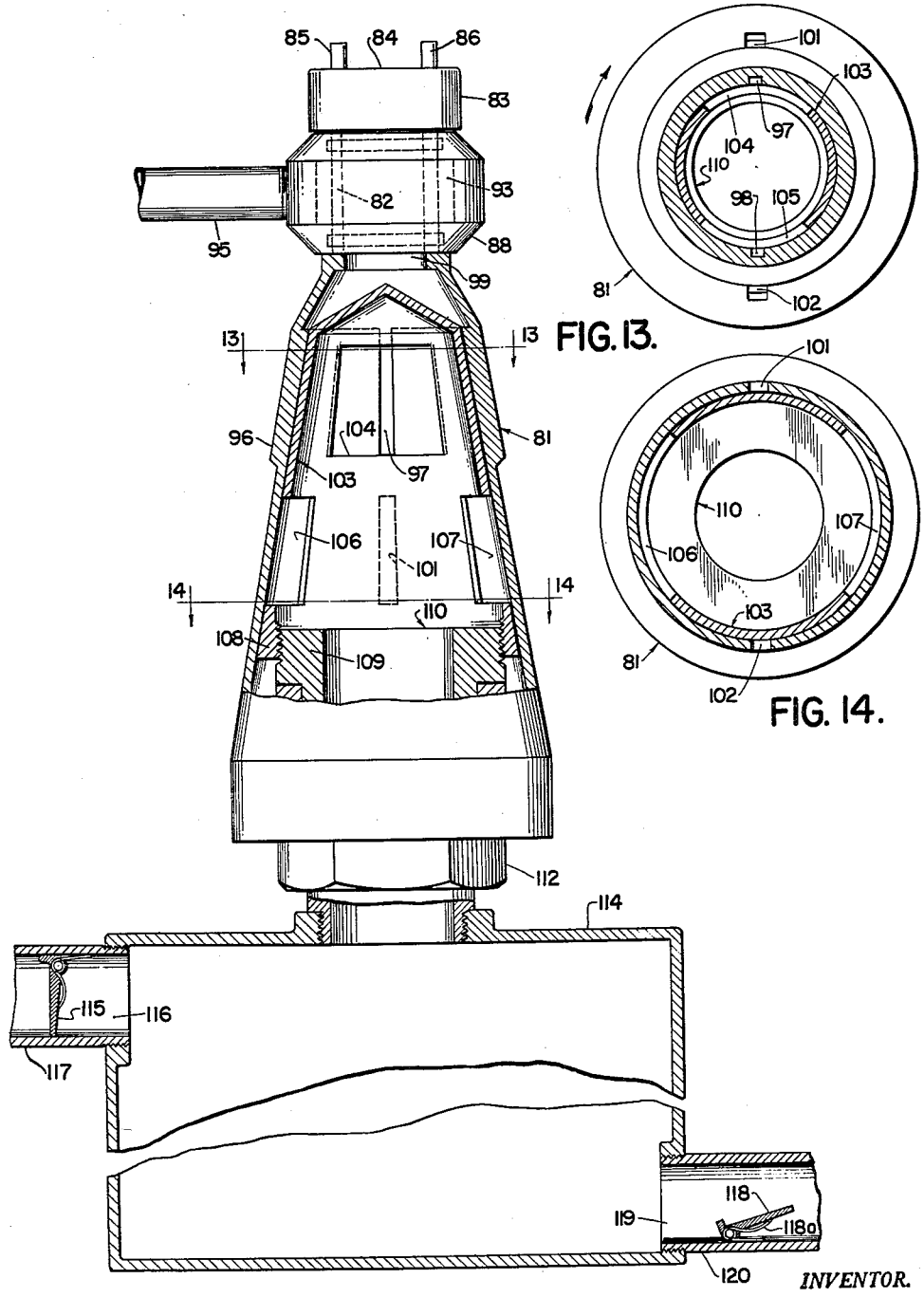
FIG. 12 is a longitudinal section substantially like FIG. 8, but showing the device in its charging position.
FIG. 13 is a section of FIG. 12 taken along line 13—13.
FIG. 14 is a section of FIG. 12 taken along line 14—14.

In the operation of this device, a fluid medium under pressure is introduced through conduit 26 into the passageway 54; and the link 50 is reciprocatingly actuated, by hand, foot or other known means, to cause a reciprocation of arm 47 between its two selected positions, thereby causing, as aforesaid, the rotation of said inner sleeve member 29 between its two selected positions, to cause alternate charging and discharging operations of the mechanism, each charging operation causing an operative actuation of the said pressure-actuated devices 72 and 73, and each discharging operation causing a discharge of the fluid medium. When the inner sleeve member is in the charging position indicated in FIGS. 1, 5 and 6, the inlet channels 51 and upper inlet ports 56 are in registry, whereas the lower exhaust ports 55 and 57 are out of registry. The fluid will accordingly enter the interior of the inner sleeve 29 through the channels 51 and ports 56; and since the exhaust ports 57 are closed, the fluid will pass downwardly through the conduit 62 of the member 39 and outwardly through the outlet ports 63a, 63b, 63c and 63d, chamber 69, pipes 70, 71 to the said devices 72 and 73. When it is desired to reverse the action, the link 50 is operatively actuated to the selected position shown in FIGS. 5A and 6A. As indicated in FIGS. 3, 5A and 6A, in this position the upper inlet ports 56 are closed, whereas the exhaust ports 57 are open inasmuch as they are in registry with the exhaust ports 55 of the outer sleeve member, whereupon the fluid in the apparatus will escape into the atmosphere (or a suitable discharge duct not shown) through the exhaust ports 57 and 55.

During the aforesaid charging operation, the fluid under pressure enters the inner sleeve through a plurality of diametrically opposite ports 56, creating diametrically opposite and equal thrusts against the opposite wall portions 31a of the outer sleeve at the regions directly behind said ports 56 (FIGS. 1 and 5). During the course of travel of the incoming fluid (which is under pressure), it will exert equal and diametrically opposite pressures against the opposite wall portions 31b of the outer sleeve member (FIG. 6), against the diametrically opposite wall portions 60a, 60b, 60c, 60d and other similar portions of the upper part of the inner sleeve member, against the diametrically opposite wall portions 61a, 61b, 61c, 61d and other similar portions of the lower part of the inner sleeve member, and against the circumferential solid portions 78, 79 and 80 of the inner sleeve member (FIG. 1). It is thus evident that there is at all times, during the charging cycle, a balanced condition assuring equal pressure at all contacting portions of the two sleeves. A similar balanced condition prevails upon discharge. Furthermore, all said counterbalanced and equally distributed forces are taken up by said roller bearing assembly, whereby the coacting sleeves are permitted freedom of operative movement regardless of the pressure of the fluid medium. It is thus apparent that the mechanism can be actuated by very slight driving power.

The arrangement is hence such as completely to avoid the undesirable condition that prevails in conventional devices wherein with each charging surge there is a thrust to one side or in one direction, causing excessive wear, uneven operation and, due to excessive friction, high power consumption.

It is preferred that for each cycle, the operative arcuate rotation of the reciprocating link 50, measured in degrees, be equal to the circumferential widths, measured in degrees, of an inlet channel plus an exhaust port. For example, by referring to FIGS. 5 and 5A, the arcuate movement of arm 47 carrying link 50 from the position in FIG. 5 to the position in FIG. 5A is equal to the sum of the circumferential widths of channel 51 and port 55. By referring to FIG. 6, it should be noted that X represents the circumferential width, in degrees, of the inlet channel 51, and Y represents the circumferential width, in degrees, of the exhaust port 57, the aforesaid arcuate movement of link 50 being equal to X plus Y.

It is apparent from the foregoing description that the oscillatory movements of the inner sleeve can be made extremely small by narrowing the inlet and exhaust openings to minimum widths dependent upon the viscosity of the fluid used.

It is further to be noted that this device is not limited to the operative use of full widths of the inlet openings, since the operative movements of the link 50 may be such as to move the coacting inlet openings into partial registry, when reduced pressures may be required by the pressure actuated apparatus.

The form of my invention illustrated in FIGS. 8 to 14 is adapted for continuous operation of the rotatable sleeve, and is shown applied to a pumping apparatus. In this construction, the outer sleeve member 81 is the rotatable element, said member having a neck portion 82 in threaded engagement with the cap 83, the top wall 84 of which supports two diametrically opposite pins 85 and 86 connected to rotary driving means (not shown). Rotatably mounted over the said neck portion 82 is the conduit ring 88 with packings 89 and 90, the apertures 91 of the said neck portion 82 communicating with the annular chamber 93 which in turn communicates with the passageway 94 of the fluid inlet pipe 95.

The upper portion 96 of the outer sleeve member 81 has on the interior thereof two diametrically opposite longitudinal inlet channels 97 and 98 open at the top for communicating with the passageway 99 of the neck portion 82, and closed at the bottom at 100. In longitudinal alignment with said channels are the two diametrically opposite exhaust ports 101 and 102 at the bottom portion of the outer sleeve member. The inner sleeve member 103, proportioned to conform with the conical configuration of the outer sleeve member, has at the upper portion thereof the two diametrically opposite inlet ports 104 and 105, and at the lower portion thereof the two diametrically opposite exhaust ports 106 and 107 removed 90° circumferentially from the inlet ports 104 and 105. It will be observed that the said inlet channels 97 and 98 and the said exhaust ports 101 and 102 of the outer sleeve are relatively narrow, whereas the inlet ports 104 and 105 and the exhaust ports 106 and 107 of the inner sleeve are relatively wide, for reasons which will be hereinbelow set forth.

The inner sleeve member 103 has at the bottom thereof the thickened peripheral portion 108 in threaded supporting engagement with the upper flange 109 of the conduit member 110. Operatively disposed between the outer surface of said conduit 110 and the inner surface of the outer sleeve 81 is the roller bearing assembly 111 substantially like that of the corresponding assembly in the form first above described, said assembly 111 being adjustably supported by the bushing 112 in threaded engagement with the bottom annular portion 113 of said outer sleeve 81, said bushing having the packing 112a in circumferential engagement with said conduit member 110 in known manner. The conduit member 110 extends downwardly and is secured to the pump casing 114, the conduit communicating with the interior of the casing. The spring-loaded inlet valve 115 of the pump structure is positioned in coactive relation to the inlet aperture 116 to which the inlet pipe 117 is connected, the spring-loaded outlet valve 118 being positioned in coactive relation to the outlet aperture 119 operatively associated with the outlet pipe 120.

In the operation of this form of my invention, a continuously rotating torque is applied, in known manner, to said pins 85 and 86, to cause a rotation of the cap 83 and consequently of the entire outer sleeve member 81— a suitable gaseous fluid under pressure being introduced through inlet pipe 95, passageway 94, annular chamber 93 and the apertures 91 into the neck portion 82. When the two coacting sleeve members are in the relative positions shown in FIGS. 8, 10 and 11, the device is in the discharging portion of its cycle, with exhaust ports 101 and 106 in registry, and exhaust ports 102 and 107 in registry, the inlet ports 104 and 105 being out of registry with the respective inlet channels 97 and 98. The gaseous fluid within the system will accordingly pass out through the said exhaust ports, while the inlet ports are closed; and since in this part of the cycle the pressure within casing 114 is obviously reduced, the incoming liquid in pipe 117 will open the valve 115; and the spring 118a of valve 118 together with the back pressure within the outlet pipe 120 will cause said valve 118 to close, whereby liquid will enter the casing 114 until the beginning of the charging cycle. This occurs when the outer sleeve member 81 (rotating in the direction of the arrows shown in FIGS. 10 and 13), will have moved to the position indicated in FIGS. 12, 13 and 14, at which position the respective inlet ports 97, 104 and 98, 105 are in registry, and the respective exhaust ports 101, 106 and 102, 107 are out of registry. The pressure of the incoming gas flowing down through the stationary inner sleeve member 103, conduit 110 and into the pump casing 114 will cause the valve 115 to close and the valve 118 to open, as illustrated. It is, of course, evident that the above-described action will effect a pumping of the liquid in the casing out through the outlet pipe 120.

Inasmuch as the inlet channels 97 and 98 are in longitudinal alignment with the respective exhaust ports 101 and 102 of the outer sleeve member 81, the said inlet channels will be in coactive relation with the said respective inlet ports 104 and 105 when the said exhaust ports 101 and 102 are out of registry with the respective exhaust ports 106 and 107, so that during the entire charging part of the cycle there is no discharge through the exhaust ports 101 and 102, and during the discharging part of the cycle there is no entry of the fluid through the ports 104 and 105. The respective charging and discharging portions of the cycles will occur during the entire time that the said narrow inlet channels 97 and 98 sweeps across the lateral extends of said relatively wide inlet ports 104 and 105, and during the entire time that said relatively narrow exhaust ports 101 and 102 sweep across the lateral extents of said relatively wide exhaust ports 106 and 107—whereby considerably longer charging and discharging periods occur per revolution than in the form of my invention first above described. The charging and discharging cycles thus occur alternately during the continuous rotation, in one direction, of the outer sleeve 81.

As in the first-described embodiment of my invention, there is a completely balanced arrangement, due to the diametrically opposed positions of the respective channels and ports. In the preferred form of this embodiment of my invention as illustrated, the pins 85 and 86 are diametrically opposite, so that the applied rotating force will result in no unbalancing of this apparatus.

In the embodiment illustrated in FIGS. 15 to 22, an inner sleeve member 121, rotatably disposed within outer sleeve member 122, is operatively oscillated between two selected positions by an arm 123, substantially in the manner of the first form above described, the clamp 124 being affixed to the neck 125 connected to the inlet pipe 126. The bottom of the said outer sleeve 122 has the thickened wall 113a with which the adjusting bushing 112b is in threaded engagement, said bushing supporting the roller bearing means 111a in the manner aforesaid, said bearing means being operatively disposed between the outer sleeve 122 and the annular wall 178 of the upper conduit member 175, the latter having the flange 176 in threaded engagement with the lower thickened portions 177 of the inner sleeve 121. The bottom of said wall 178 is in abutting engagement with the top of flange 129 of the bottom conduit member 127 (FIGS. 15 and 19), the latter member having an annular wall 128 which is in longitudinal alignment with said wall 178. The upper and lower conduit members 175 and 127, respectively, are held together by the union nut 171 in threaded engagement with said flange 129, the annular wall 174 overlying the retaining ring 172 in threaded engagement with threaded portion 173 at the bottom of wall 178.

Integral with said bottom conduit member 127 is the partition member generally designated 144, said partition member extending from the base 130 upwardly beyond said flange 129 to a level in the region of the top surface 179 of said upper conduit member 175. The said partition member 144 consists of four longitudinally extending radial partition walls 149, 150, 151 and 152. Disposed within the said inner sleeve member 121 is the upper partition member 180 comprising four longitudinally extending radial partition walls 149a, 150a, 151a and 152a extending downwardly from the roof 153 of the inner sleeve member to the top of said radial walls 149, 150, 151 and 152 and in longitudinal alignment therewith, thereby forming four compartments 145, 146, 147 and 148 independent of each other and extending between said roof 153 and said floor 130. In the preferred arrangement illustrated, the tops of the lower partition walls 149, 150, 151 and 152 are channel-shaped, the bottoms of the upper partition walls 149a, 150a, 151a and 152a extending into said channel-shaped portions generally designated 181 (FIG. 15). It is required for best operation that there be no leakage between compartments; hence, in the preferred construction, the lateral edges of the compartment walls, such as the edge 149b of wall 149 (FIG. 17A), are provided with packing strips 182 in pressing engagement with the adjacent annular wall, such as the wall 178.

The longitudinal extent of the said annular wall 128 of member 127 is sufficient to rotatably accommodate conduit ring members 131 and 132, each being substantially like the conduit ring 66 of the embodiment first above described. Conduit ring 131 contains the annular chamber 133 communicating with the diametrically opposite outlet apertures 134 and 135 and the diametrically opposite pipes 136 and 137; and conduit ring 132 contains the annular chamber 138 communicating with the diametrically opposite outlet apertures 139 and 140 and the respective coacting pipes 141 and 142. The said pipes 136, 137, 141 and 142 lead to pressure fluid actuated devices not shown, but substantially of the category of devices 72 and 73 illustrated in FIG. 1. Both conduit rings 131 and 132 are provided with packing rings, generally designated 143.

The outer sleeve member 122 is provided at the top with spaced longitudinal inlet channels divided into four sets: 155a, 155b, 155c; 156a, 156b, 156c; 157a, 157b, 157c; and 158a, 158b, 158c. Said outer sleeve is provided at a lower section with similarly situated four sets of exhaust ports: 159a, 159b, 159c; 160a, 160b, 160c; 161a, 161b, 161c; 162a, 162b, 162c. The inner sleeve member 121 is provided at the top with four sets of inlet ports: 163a, 163b, 163c; 164a, 164b, 164c; 165a, 165b, 165c; 166a, 166b, 166c. Said inner sleeve is provided at a lower section with similarly situated four sets of exhaust ports: 167a, 167b, 167c; 168a, 168b, 168c; 169a, 169b, 169c; 170a, 170b, 170c. It will be observed that each inlet channel and each of the inlet and exhaust ports has a diametrically opposite counterpart so as to produce the balanced effect hereinabove described.

In the device as illustrated in FIGS. 15–18, fluid under pressure, flowing through neck portion 125, will enter the opposite compartments 145 and 147 through the channels 155a, 155b, 155c, and 157a, 157b, 157c, and the inlet ports 163a, 163b, 163c, and 165a, 165b, 165c in registry with the coactive last-mentioned channels. In this position the outer sleeve's exhaust ports 159a, 159b, 159c, and 161a, 161b, 161c are out of registry with the corresponding exhaust ports 167a, 167b, 167c, and 169a, 169b, 169c of the inner sleeve so that said compartments 145 and 147 contain only charging fluid. In the same relative positions of the inner and outer sleeves, the compartments 146 and 148 contain only discharging fluid, since the inlet channels 156a, 156b, 156c, and 158a, 158b, 158c are not in registry with the respective inlet ports 164a, 164b, 164c, and 166a, 166b, 166c, whereas the exhaust ports 160a, 160b, 160c, and 162a, 162b, 162c are in registry with the respective exhaust ports 168a, 168b, 168c, and 170a, 170b, 170c.

Figure 21:
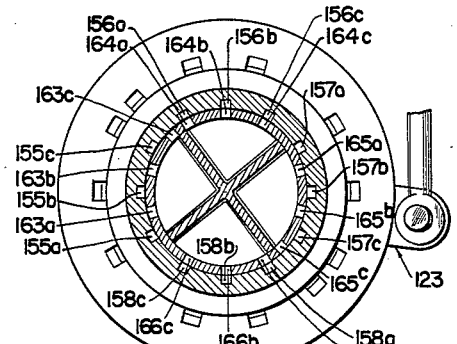
FIG. 21 is a section of FIG. 20 taken along line 21—21.
Figure 22:
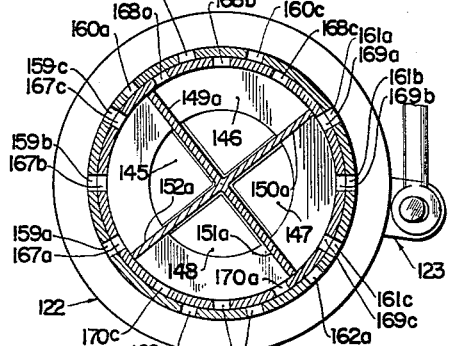
FIG. 22 is a section of FIG. 20 taken along line 22—22.
Figure 19:
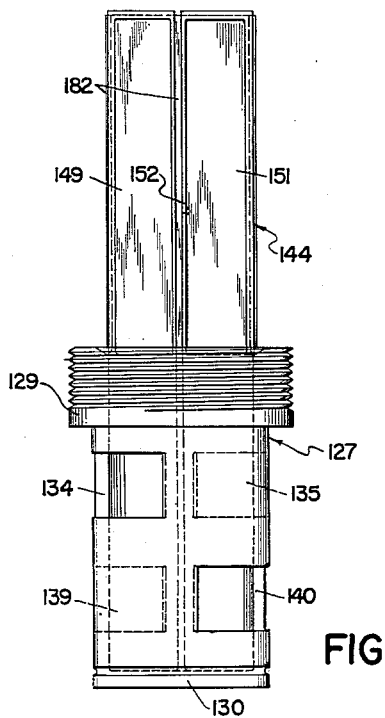
FIG. 19 is a front elevational view of the bottom casing member and upwardly extending partition structure of the embodiment of FIG. 15.
Figure 20:
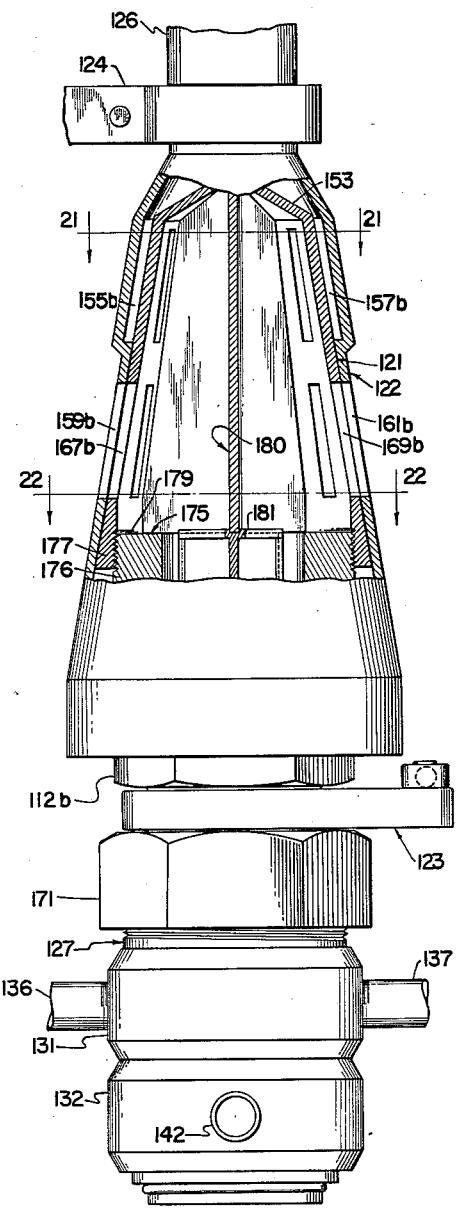
FIG. 20 is a longitudinal section, partly in elevation, of the device of FIG. 15, but in another operative position.

In the position of my apparatus as illustrated in FIGS. 20–22 it is evident, from the relative positions of the coacting channels and ports of the inner and outer sleeve members, that compartments 146 and 148 are in charging positions, whereas compartments 145 and 147 are in discharging positions.

By referring to FIG. 18 it will be seen that compartments 145 and 147 are at all times in communication, through outlet apertures 134 and 135, with annular chamber 133 of conduit ring 131, and hence with pipes 136 and 137, and out of communication with the annular chamber 138 of the conduit ring 132. The compartments 146 and 148 are at all times kept out of communication with annular chamber 133 of conduit ring 131, but are in communication, as seen in FIG. 18A, through outlet apertures 139 and 140, with annular chamber 138 of the conduit ring 132, and hence are at all times in communication with the pipes 141 and 142.

It is thus evident that by short operative strokes of arm 123, four separate devices can be actuated by this form of my invention, two being actuated when the inner sleeve 121 is in one of its two selected positions, and the other two when the inner sleeve 121 is in the other of its said selected positions—the charging occurring in two of said compartments during the time that discharging occurs in the other two. It is to be noted that this apparatus may readily be adapted to actuate two separate devices by proper connections between the compartments. And it may also be adapted to actuate a single device with a movable element operable by fluid pressure in opposite directions.

As in the other forms of my invention, the diametrically opposite channels and ports result in the balanced operation according to one of the main objectives of my invention.

FIGURES 23 to 26A illustrate an embodiment of my invention substantially like that of FIG. 1, but having intermittent driving means in one direction instead of the oscillating driving means. The respective outer and inner sleeve members 183 and 184 and their respective inlet and exhaust channels and ports, and all the coactive elements other than the driving means, are constructed and are positioned for coaction substantially in the manner of the form of my invention first above described, and hence no further description thereof need be given for an understanding of this embodiment.

The said intermittent driving means comprises a ratchet and pawl arrangement, the ratchet member 185 being circumferentially mounted about the annular wall 186. The pawl member comprises the slide 187 carrying the pawl element 188, pivotally mounted at 189, operatively in engagement with the ratchet teeth 190. A cam 191, rotatable in the direction of the arrow (FIG. 24), urges the slide 187 towards the right when the high point 192 of the cam engages the roller 193, said slide moving through the guide 194 against the action of spring 195. The said movement of the slide 187 to the right is the operative stroke of the pawl, the pawl tip 196 engaging an adjacent tooth and causing an operative rotation of the inner sleeve 184. Upon the continued operative rotation of the cam 191, the slide 187 will retract under the influence of the spring 195, whereupon the said pawl tip 196 will ride back over the teeth, against the action of spring 197, until the next operative stroke of the slide 187.

With a predetermined arrangement, positioning and dimensioning of the ratchet and pawl mechanism and the relative distance ebtween the coacting ports and channels, successive charging and discharging cycles can be continuously produced. It is of course required that the respective coacting inlet channels and ports be equally spaced, and similarly that the respective coacting exhaust ports be equally spaced, so that at the end of successive alternate rotational movements of the inner sleeve member 184, there will be corresponding operative registering of coactive inlet orifices and non-registering of coactive exhaust orifices, and operative registering of coactive exhaust orifices and non-registering of coactive inlet orifices, respectively, as indicated in FIGS. 26 and 26A.

In the various embodiments above described, the main operative components are the two coacting sleeves, which constitute substantially the entire volume of the device. The device is hence extremely economical of space. This factor is further enhanced by the inherent adaptability of this device—in all its embodiments—to operatively accommodate therein a relatively large number of inlet and exhaust openings, since extremely narrow openings can be used, closely spaced. Hence, a relatively small unit can operate with large volumes of fluid. Moreover, because of its compactness and the large number of coactive openings, this device is extremely well suited to operate under conditions of sudden inlet and exhaust fluid surges. Furthermore, as appears from the embodiments above disclosed, the inlet and exhaust ports on the coacting sleeves may be proportioned and positioned in various ways in accordance with requirements.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a valve mechanism, a pair of cooperating inner and outer sleeve valve members with coactively positioned inlet and exhaust openings, each of said members having a plurality of said inlet openings at one level and a plurality of said exhaust openings at another level; fluid supply passage-way means in communication with said inlet openings, one of said members having an outlet opening adapted for communication at one instant with said inlet openings and at another instant with said exhaust openings, and bearing means interconnecting said members in an optimal position, said outer sleeve member being in supporting engagement with said bearing means.

2. In a valve mechanism, a frusto-conical inner sleeve member, a frusto-conical outer sleeve member disposed about said inner sleeve member, one of said members being rotatable relative to the other member about its longitudinal axis, the lateral wall of said outer member having at an upper portion thereof a plurality of circumferentially disposed channels and at a lower portion thereof a plurality of circumferentially disposed ports, there being an even number of said channels and said ports, respectively, and arranged with opposite channels in diametral relation and opposite ports in diametral relation, the lateral wall of said inner member having at an upper portion thereof a plurality of circumferentially disposed upper ports and at a lower portion thereof a plurality of circumferentially disposed lower ports, there being an even number of said last-mentioned upper and lower ports, respectively, and arranged with the opposite ports of said respective upper and lower portions of the inner member in diametral relation, said ports and channels being so positioned that at predetermined relative positions of said inner and outer sleeve members certain of said upper ports of the inner sleeve member and certain of said channels are in registry and certain of said respective lower ports of the inner and outer sleeve members are out of registry, and at certain other predetermined relative positions of said inner and outer sleeve members certain of said upper ports and certain of said channels are out of registry and certain of said respective lower ports of the inner and outer sleeve members are in registry; fluid supply means in communication with said channels; and a conduit communicating with the interior of said inner sleeve member.

3. In a valve mechanism, a frusto-conical inner sleeve member having a fluid outlet passage-way, and a frusto-conical outer sleeve member disposed about said inner sleeve member having a fluid supply passage-way in axial alignment with said outlet passage-way, one of said members being rotatable relative to the other member about its longitudinal axis between two selected positions, each of said members having a plurality of inlet openings at one level adapted for communication with said supply passageway and a plurality of exhaust openings at another level adapted for communication with said outlet passageway, said respective inlet and exhaust openings being arranged and so positioned that at one of said selected positions only the inlet openings of the respective members are in registry, and at the other of said selected positions only the exhaust openings of said members are in registry.

4. In a valve mechanism, a frusto-conical inner sleeve member, a frusto-conical outer sleeve member disposed about said inner sleeve member, one of said members being rotatable relative to the other member about its longitudinal axis in one direction, means for operatively actuating said rotatable member, each of said members having an even plurality of inlet openings at one level and an even plurality of exhaust openings at another level, said respective inlet and exhaust openings being arranged with opposite openings in diametral relation and so positioned that at predetermined relative positions of said members only the said inlet openings of the respective members are in registry, and at certain other predetermined relative positions of said members only the exhaust openings of said members are in registry; fluid supply means in communication with said inlet openings; and a conduit having an outlet communicating alternately with said inlet and exhaust openings.

5. In a valve mechanism, the combination according to claim 4, wherein said operatively actuating means is arranged and constructed to impart a balanced axial torque to said rotatable member.

6. In a valve mechanism, a pair of cooperating sleeve valve members, one being an inner member and the other an outer member disposed about said inner member, said members having coactively positioned inlet openings at one level and coactively positioned exhaust openings at another level; fluid supply means in communication with said inlet openings; a conduit having an outlet opening communicating alternately with said inlet and exhaust openings, said conduit being attached to a bottom portion of said inner sleeve member and extending downwardly therebeyond, said outer member extending downwardly below said bottom portion of said inner member; and bearing means operatively disposed between said downwardly extending portion of said outer member and said conduit.

7. In a valve mechanism, the combination according to claim 6, and an adjustable bushing attached to the lower portion of said outer member and in supporting engagement with said bearing means, whereby said inner and outer members may be set in adjusted predetermined mutual relation.

8. In a valve mechanism, a pair of cooperating sleeve valve members, one being an inner member and the other an outer member disposed about said inner member, one of said members being rotatable relative to the other member about its longitudinal axis, said members having coactively positioned inlet openings at one level and coactively positioned exhaust openings at another level; fluid supply conduit means in communication with said inlet openings; fluid outlet conduit means communicating with said exhaust openings; a conduit ring in rotatable circumferential engagement with one of said conduit means, said last mentioned conduit means having apertured portions therein, said ring having an annular chamber in communication with said apertured portions, and pipe means attached to said ring and communicating with said annular chamber.

9. In a valve mechanism, the combination according to claim 8, said inner member being rotatable, said outlet conduit means being attached to said inner member and having a lateral annular wall, said conduit ring being in rotatable engagement with said annular wall.

10. In a valve mechanism, the combination according to claim 8, said outer member being rotatable, said supply conduit having a lateral annular wall, said conduit ring being in rotatable engagement with said annular wall.

11. In a valve mechanism, a pair of frusto-conical cooperating sleeve valve members, one being an inner member and the other an outer member disposed about said inner member, each of said members having an even plurality of inlet openings at one level and an even plurality of exhaust openings at another level, said respective inlet and exhaust openings being arranged with opposite openings in diametral relation and so positioned that at predetermined relative positions of said members only the said inlet openings of the respective members are in registry, and at certain other predetermined relative positions of said members only the exhaust openings of said members are in registry; fluid supply conduit means in communication with said inlet openings; fluid outlet conduit means communicating alternately with said inlet and exhaust openings; said fluid outlet conduit being attached to said inner sleeve member and having a lateral annular wall with apertured portions therein; a conduit ring in rotatable circumferential engagement with said wall, said ring having an annular chamber in communication with said apertured portions, pipe means attached to said ring and communicating with said annular chamber; and means to rotatably actuate said inner sleeve member and the attached outlet conduit.

12. In a valve mechanism, a pair of frusto-conical cooperating sleeve valve members, one being an inner member and the other an outer member disposed about said inner member, each of said members having an even plurality of inlet openings at one level and an even plurality of exhaust openings at another level, said respective inlet and exhaust openings being arranged with opposite openings in diametral relation and so positioned that at predetermined relative positions of said members only the said inlet openings of the respective members are in registry, and at certain other predetermined relative positions of said members only the exhaust openings of said members are in registry; fluid supply conduit means in communication with said inlet openings; fluid outlet conduit means communicating alternately with said inlet and exhaust openings; said fluid outlet conduit being attached to said inner sleeve member; said supply conduit having a lateral annular wall with apertured portions therein; a conduit ring in rotatable circumferential engagement with said wall, said ring having an annular chamber in communication with said apertured portions, pipe means attached to said ring and communicating with said annular chamber, and means to rotatably actuate said outer sleeve member.

13. In a valve mechanism, an inner sleeve member, an outer sleeve member disposed about said inner sleeve member, one of said members being rotatable relative to the other member about its longitudinal axis between two selected positions, each of said members having a plurality of inlet openings at one level and a plurality of exhaust openings at another level, said respective inlet and exhaust openings being arranged with openings so positioned that at one of said selected positions only the inlet openings of the respective members are in registry, and at the other of said selected positions only the exhaust openings of said members are in registry, the minimal arcuate movement of said rotatable member, measured in degrees, between any one of said selected positions and its successively selected position, for complete registry, being equal to the sum of the circumferential widths, measured in degrees, of one of said inlet openings and one of said exhaust openings; fluid supply means in communication with said inlet openings; and an outlet conduit communicating alternately with said inlet and exhaust openings.

14. In a valve mechanism, a frusto-conical inner sleeve member, a frusto-conical outer sleeve member disposed about said inner sleeve member, one of said members being rotatable relative to the other member about its longitudinal axis continuously in one direction, said members having coactively positioned inlet openings at one level and coactively positioned exhaust openings at another level, the respective openings of one of said sleeve members being narrower than the coactive openings of the other of said sleeve members; fluid supply means in communication with said inlet openings; and an outlet conduit axially disposed with respect to said sleeve members communicating alternately with said inlet and exhaust openings.

15. In a valve mechanism, the combination according to claim 14, said conduit being attached to said inner sleeve member and extending downwardly therefrom, said outer sleeve member being rotatable and extending downwardly beyond said inner member and enveloping a portion of said conduit, and adjustably supported bearing means between said conduit and the said enveloping portion of said outer member, whereby said inner and outer members may be set in adjusted predetermined mutual relation.

16. In a valve mechanism, a frusto-conical inner sleeve member, a frusto-conical outer sleeve member disposed about said inner sleeve member, one of said members being rotatable relative to the other member about its longitudinal axis between two selected positions, said members having coactively positioned inlet openings at one level and coactively positioned exhaust openings at another level, said inner member being divided into a plurality of compartments, said inlet openings of the inner member comprising a plurality of sets of openings, each of said sets communicating with one of said compartments, said exhaust openings of said inner member comprising a plurality of sets of openings, each of said latter sets communicating with one of said compartments, said respective inlet and exhaust openings being so positioned that at one of said selected positions only the inlet openings of a pair of opposed compartments are in registry with the coactive inlet openings of said outer member, and at the other of said selected positions only the exhaust openings of said pair of opposed compartments are in registry with the coactive exhaust openings of said outer member; fluid supply means in communication with said inlet openings; and outlet conduit means extending downwardly from said inner sleeve member, said conduit means having a plurality of compartments corresponding in number to and in longitudinal alignment with said compartments of said inner member, whereby a plurality of continuous compartments are formed communicating with said respective sets of openings of said inner member.

17. In a valve mechanism, the combination according to claim 16, an upper partition member in the said inner sleeve member having a plurality of substantially radial walls forming said compartments, and a lower partition member in said conduit means having a plurality of substantially radial walls corresponding in number to and in longitudinal alignment with said radial walls of said upper partition member, said radial walls of the lower partition member forming said compartments in said conduit means.

18. In a valve mechanism, the combination according to claim 16, an upper partition member in the said inner sleeve member having a plurality of substantially radial walls forming said compartments, and a lower partition member in said conduit means having a plurality of substantially radial walls corresponding in number to and in longitudinal alignment with said radial walls of said upper partition member, said radial walls of the lower partition member formng said compartments in said conduit means, said radial walls of said respective upper end lower partition members being in interlocking engagement.

19. In a valve mechanism, the combination according to claim 16, said conduit means comprising an upper conduit member and a lower conduit member disposed therebelow and in longitudinal alignment therewith, said upper conduit member being in threaded engagement with said inner sleeve member, said lower conduit member comprising an annular wall and a lower partition member having a plurality of substantially radial walls extending from the bottom of said annular wall upwardly into said upper conduit member and forming said compartments of said conduit means, an upper partition member in said inner sleeve member having a plurality of substantially radial walls corresponding in number to and in longitudinal alignment with said radial walls of said lower partition member, said radial walls of the upper partition member forming said compartments in said inner sleeve member.

20. In a valve mechanism, the combination according to claim 16, said conduit means comprising an upper conduit member having an annular wall and a lower conduit member disposed therebelow and in longitudinal alignment therewith, said upper conduit member being in threaded engagement with said inner sleeve member, said lower conduit member comprising an annular wall and a lower partition member having a plurality of substantially radial walls extending from the bottom of said lower conduit annular wall upwardly into said upper conduit member and forming said compartments of said conduit means, an upper partition member in said inner sleeve member having a plurality of substantially radial walls corresponding in number to and in longitudinal alignment with said radial walls of said lower partition member, said radial walls of the upper partition member forming said compartments in said inner sleeve member; said radial walls of the lower partition member having sealing means in engagement with the annular wall of said upper conduit member, and means for detachably securing together said upper and lower conduit members.

21. In a valve mechanism, the combination according to claim 16, said plurality of compartments comprising pairs of diametrically opposite compartments, said sets of the respective openings being so arranged that the coacting inlet openings of each of said pairs of compartments will be simultaneously in their respective registered positions, and the coacting exhaust openings of said pairs of compartments will be simultaneously in their respective registered positions whereby each of said pairs of compartments is cycled simultaneously to provide a balanced condition in the valve mechanism.

22. In a valve mechanism, the combination of claim 16, said compartments being divided into two sets, said compartments and said inlet and exhaust openings being so arranged that at one of said selected positions said coacting inlet openings of one of said sets of compartments, and said coacting exhaust openings of the other of said sets of compartments are, respectively, in registry, and in the other of said selected positions, the said coacting exhaust openings of the first-mentioned of said sets of compartments and the said coacting inlet openings of the second-mentioned of said sets of compartments are, respectively, in registry.

23. In a valve mechanism, the combination according to claim 16, said conduit means comprising an upper conduit member having an annular wall and a lower conduit member disposed therebelow and in longitudinal alignment therewith, said upper conduit member being in threaded engagement with said inner sleeve member, said lower conduit member comprising an annular wall and a lower partition member having a plurality of substantially radial walls extending from the bottom of said lower conduit annular wall upwardly into said upper conduit member and forming said compartments of said conduit means, an upper partition member in said inner sleeve member having a plurality of substantially radial walls corresponding in number to and in longitudinal alignment with said radial walls of said lower partition member, said radial walls of the upper partition member forming said compartments in said inner sleeve member, said radial walls of the lower partition member having sealing means in engagement with the annular wall of said upper conduit member; means for detachably securing together said upper and lower conduit members, said annular wall of said lower conduit member having apertured portions at more than one level; and a conduit ring member at each of said apertured levels in rotatable circumferential engagement with said lower conduit annular wall, each of said conduit rings having an annular chamber in communication with said respective apertured portions.

24. In a valve mechanism, the combination according to claim 16, said conduit means comprising an upper conduit member having an annular wall and a lower conduit member disposed therebelow and in longitudinal alignment therewith, said upper conduit member being in threaded engagement with said inner sleeve member, said lower conduit member comprising an annular wall and a lower partition member having a plurality of substantially radial walls extending from the bottom of said lower conduit annular wall upwardly into said upper conduit member and forming compartments of said conduit means, an upper partition member in said inner sleeve member having a plurality of substantially radial walls corresponding in number to and in longitudinal alignment with said radial walls of said lower partition member, said radial walls of the upper partition member forming said compartments in said inner sleeve member, said radial walls of the lower partition member having sealing means in engagement with the annular wall of said upper conduit member; means for detachably securing together said upper and lower conduit members, said annular wall of said lower conduit member having apertured portions at more than one level; and a conduit ring member at each of said apertured levels in rotatable circumferential engagement with said lower conduit annular wall, each of said conduit rings having an annular chamber continuously in communication with said respective apertured portions, said apertured portions of the annular wall of said lower conduit being of equal proportions, even numbers and arranged at each level with opposite openings in diametral and symmetrical relation.

25. In a valve mechanism, an inner sleeve member, an outer sleeve member disposed about said inner sleeve member, each of said members having a pluarlity of inlet openings at one level and a plurality of exhaust openings at another level, one of said members being rotatable relative to the other member about its longitudinal axis between selected positions, whereby said inlet and exhaust openings are respectively registrable, said respective inlet and exhaust openings being divided into a plurality of sets, and so positioned that at each of said selected positions only the coacting openings of certain of said sets are in registry, said respective inlet and exhaust openings being relatively narrow in width, the minimum of the arcuate movement of said rotatable member, measured in degrees, between any one of said selected positions and its successive selected position, for complete registry, being equal to the sum of the circumferential widths, measured in degrees, of one of said inlet openings and one of said exhaust openings; fluid supply passage-way means in communication with said inlet openings, and an outlet conduit communicating with the interior of said inner sleeve member.

26. In a valve mechanism, an inner sleeve member, an outer sleeve member disposed about said inner sleeve member; said inner sleeve member being divided into a plurality of compartments, each of said compartments having a set of inlet openings, a set of exhaust openings, an outlet; said outer sleeve member having a plurality of sets of inlet and exhaust openings coactively corresponding to said sets of inlet and exhaust openings of the inner sleeve member, one of said members being rotatable with respect to the other member about its longitudinal axis between selected positions, whereby the entire number of said sets of inlet and exhaust openings are controlled together and whereby at each of said selected positions only two sets of inlet openings of a predetermined pair of associate compartments are in registry with their coactive openings, and only the two sets of exhaust openings of said predetermined pair are out of registry with their coactive openings; and a common fluid supply passage-way means adapted for communication with said sets of inlet openings.

27. In a valve mechanism, an inner sleeve member, an outer sleeve member disposed about said inner sleeve member in a predetermined positional relationship, one of said members being rotatable relative to the other member about its longitudinal axis between two selected positions, said outer sleeve member having in its wall a plurality of circumferentially disposed channels, said inner sleeve member having in its wall a plurality of circumferentially disposed ports, said channels and said ports being in registry when said rotatable member is in one of its said selected positions, said channels and said ports being out of registry when said rotatable member is in the other of its said selected positions, passage-way means in communication with said channels, second passage-way means in communication with said ports, and annular anti-friction bearing means interconnecting said members in an optimal position.

28. In a valve mechanism, an inner sleeve member, an outer sleeve member disposed about said inner sleeve member in a predetermined positional relationship, one of said members being rotatable relative to the other member about its longiutdinal axis between two selected positions, said outer sleeve member having in its wall a plurality of circumferentially disposed channels, said inner sleeve member having in its wall a plurality of circumferentially disposed ports, said inner member being divided into a plurality of compartments, each compartment having a set of said inner member ports, said channels and said sets of ports being in registry when said rotatable member is in one of its said selected positions, said channels and said sets of ports being out of registry when said rotatable member is in the other of its said selected positions, passage-way means in communication with said channels, and second passage-way means in communication with said ports, said passage-way means being in axial alignment with one another.

29. In a valve mechanism, an inner sleeve member, an outer sleeve member disposed about said inner sleeve member; said inner sleeve member being divided into a plurality of compartments, each of said compartments having at least one inlet opening, at least one exhaust opening and an outlet; said outer sleeve member having a plurality of inlet openings and a plurality of exhaust openings coactively corresponding to said respective inlet and exhaust openings of the inner sleeve member; one of said members being rotatable with respect to the other member about its longitudinal axis between selected positions, whereby the entire number of said inlet and exhaust openings are controlled together and whereby at each of said selected positions at least only two inlet openings of a predetermined pair of associate compartments are in registry with their coactive openings, and at least only two exhaust openings of said predetermined pair are out of registry with their coactive openings; and a common fluid supply passage-way adapted for communication with said inlet openings.

30. In a valve mechanism, an inner sleeve member, an outer sleeve member disposed about said inner sleeve member in a predetermined positional relationship, one of said members being rotatable relative to the other member about its longitudinal axis between two selected positions, said outer sleeve member having in its wall a plurality of circumferentially disposed channels, said inner sleeve member having in its wall a plurality of circumferentially disposed ports, said inner member being divided into a plurality of compartments, each compartment having at least one of said inner member ports, said channels and said ports being in registry when said rotatable member is in one of its said selected positions, said channels and said ports being out of registry when said rotatable member is in the other of its said selected positions, passage-way means in communication with said channels, and second passage-way means in communication with said ports.

References Cited in the file of this patent

UNITED STATES PATENTS

| | | |
|---|---|---|
| 1,329,881 | Bloom | Feb. 3, 1920 |
| 2,431,836 | Snyder et al. | Dec. 2, 1947 |
| 2,755,136 | Lum | July 17, 1956 |
| 2,822,823 | Klein et al. | Feb. 11, 1958 |

FOREIGN PATENTS

| | | |
|---|---|---|
| 433,713 | Great Britain | Aug. 16, 1935 |